June 7, 1960 J. L. D. MORRISON ET AL 2,939,644

BRAKING MECHANISM FOR MAGNETIC RECORDER AND PLAYER

Filed Aug. 16, 1954

INVENTORS.
JAMES L. D. MORRISON
WILLARD J. FAULKNER
BY
George A. Gust
ATTORNEY

United States Patent Office 2,939,644

Patented June 7, 1960

2,939,644

BRAKING MECHANISM FOR MAGNETIC RECORDER AND PLAYER

James L. D. Morrison, Benton Harbor, and Willard J. Faulkner, Coloma, Mich., assignors to V-M. Corporation, Benton Harbor, Mich., a corporation of Michigan Filed Aug. 16, 1954, Ser. No. 449,937

3 Claims. (Cl. 242—55.12)

The present invention relates to a braking mechanism for a magnetic recorder and player. While the invention is particularly described in connection with mechanisms which utilize magnetic tape, it will appear obvious to those skilled in the art that the invention is equally applicable to those machines which utilize magnetic wire.

Tape recording and playing mechanisms are conventionally equipped with supply and take-up reels which are rotatable in one direction for the record or playing operations and rotatable in the opposite direction to rewind the tape on the supply reel. It is often necessary and desirable during playing or recording selectively to stop and start machine operation. In order to stop the machine, rotation of both reels is stopped. Should the take-up reel stop prior to the supply reel, tape may uncoil or spill from the latter to such an extent as to spread over a considerable area and to become inextricably entangled. Other disadvantages impairing operation and performance also occur from over-travel of the supply reel as are well known to persons skilled in the art.

In view of the foregoing, it is an object of this invention to provide a braking mechanism for a magnetic recorder and player which will always stop the supply reel ahead of the take-up reel.

It is another object of this invention to provide a braking mechanism for a magnetic player and recorder which exerts greater braking force on the supply reel than on the take-up reel.

Other objects will become apparent as the description proceeds.

To the accomplishment of the above and related objects, our invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
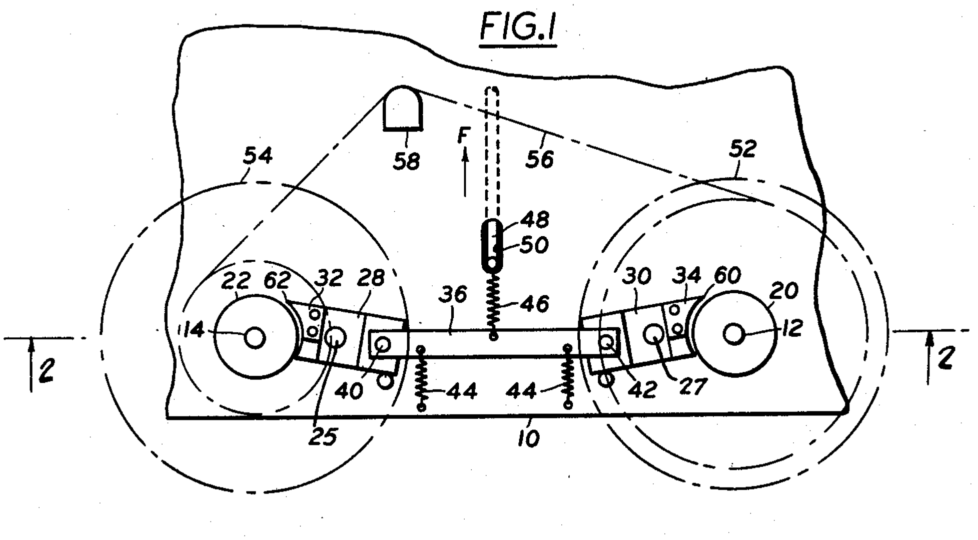
Fig. 1 is a top plan view of one embodiment of this invention.
Figure 2:
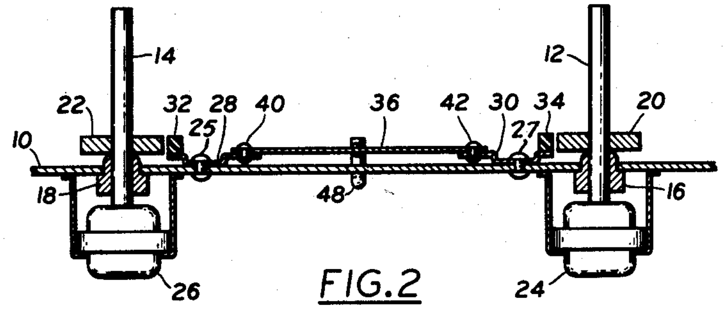
Fig. 2 is a cross-section thereof taken generally on line 2—2 of Fig. 1.

Referring to the drawings, only those portions of the magnetic player and recorder needed to disclose an embodiment of this invention are illustrated. A supporting member or chassis 10 made of flat sheet metal carries two spindles 12 and 14 in spaced apart relation. Suitable bearings 16 and 18 fixedly secured to the chassis 10 receive the respective spindles 12 and 14 which carry two brake drums 20 and 22 for rotation therewith. Two motors 24 and 26 are mounted on the chassis 10 for rotating selectively the two spindles 12 and 14 respectively. The motor 24 serves to rotate the spindle 12 in one direction while the motor 26 serves to rotate the spindle 14 in the opposite direction. These motors are alternatively operable such that only one spindle 12, 14 is operable at any one time. While these two motors 24 and 26 are illustrated and described, the preferred method of actuating the two spindles 12 and 14 is through the use of only a single motor and suitable driving connections with the two spindles as is done conventionally.

Pivotally mounted at 25 and 27 on the top side of the chassis 10 are two braking devices or shoes 28 and 30 respectively which carry rubber or the like friction blocks 32 and 34 radiused, respectively, in substantial conformity with the peripheral surfaces of the drums 22 and 20. A force-transmitting member or equalizing bar 36 is pivotally connected at its opposite ends 40 and 42 to the two brake shoes 28 and 30, respectively, whereby transverse movement of the bar 36 (upwardly as viewed in Fig. 1) will serve to pivot the shoe 28 counter-clockwise into frictional engagement with the drum 22 and the shoe 30 clockwise about its pivot into engagement with the drum 20. Two equalizing-tension springs 44 are connected between the opposite ends of the bar 36 and the chassis 10. An actuating linkage or spring 46 is connected to the center of the bar 36 to extend transversely therefrom for connection to a longitudinally reciprocable operating rod 48 which lies underneath the chassis and extends upwardly through a slot 50.

Two reels 52 and 54 of conventional design are shown mounted on the two spindles 12 and 14 respectively, and carry a tape 56 which is passed around the usual magnetic recording and playing head 58.

In operating the brake, the actuating rod 48 is moved in the direction of the arrow F thereby transversely pulling the equalizing bar 36 against the forces of the two springs 44. This movement of the bar 36 rotates the two brake shoes 28 and 30 against the brake drums 20 and 22.

Assuming counter-clockwise rotation of the two spindles 12 and 14, the reel 52 serves as the supply reel, while the reel 54 serves as the take-up reel. In applying the brake, movement of the rod 48 serves to pivot both shoes 28 and 30 into touching engagement with the respective drums. As the braking force on rod 48 is increased, the drum 22 tends to pivot the shoe 28 clockwise, thereby developing a reactionary force which produces a fixed pivot for the bar 36 to force the shoe 30 onto the drum 20. As is seen in the drawings, the toe 60 of the braking block 34 is moved clockwise by the frictional engagement into the drum thereby forcefully gripping and stopping the latter. Since the toe 62 of the brake block 32 is constantly being urged away from the drum 22, less braking force is exerted on the latter. Thus, the reel 54 can coast slightly after the drum 52 is stopped such that it is impossible for any slack to be produced in the tape 56. The brake shoe 30 acting in this manner is characterized as being "self-energizing" while the brake shoe 28 is "non-self-energizing."

Should the reels 52 and 54 be rotated in the opposite direction, opposite braking conditions will prevail; that is to say, the brake shoe 28 will be self-energizing thereby stopping the reel 54 substantially instantaneously and ahead of the reel 52.

For one direction of rotation one brake 28 or 30 is self-energizing, while in the opposite direction of rotation, the other brake is self-energizing. The braking mechanism is so arranged that only the reel supplying the tape is stopped by the self-energizing brake with the take-up reel being allowed to coast a limited amount. Even though the machine may be operated at high speeds, there is no possibility of any tape spillage when the machine is stopped. As the machine is being stopped, it is, of course, necessary that the respective motor 24, 26 be simultaneously de-energized, which may be accomplished by means of a suitable electrical switch operatively connected to the brake-applying rod 48.

What is claimed is:

1. A reel-braking mechanism for a magnetic recorder and player comprising a supporting member, two spindles rotatably carried by said member in spaced apart relation, two braking shoes movably carried by said member for operative engagement with said spindles respectively, one braking shoe being self-energizing for one direction of rotation of the respective spindle, the other braking shoe being self-energizing for opposite direction of rotation of the other spindle, an actuating bar carried pivotally by and interconnecting said braking shoes for moving the latter into frictional engagement with the respective spindles and means for moving said bar transversely thereof.

2. A reel-braking mechanism for a magnetic recorder and player comprising a supporting member, two spindles rotatably carried by said member in spaced apart relation, two brake drums rotatably carried by said spindles, two braking devices pivotally mounted on said member for frictional engagement with said drums respectively, one device being self-energizing for one direction of rotation of its drum and non-self-energizing for the opposite direction of rotation, the other device being self-energizing for said opposite direction of rotation of its drum and non-self-energizing for said one direction of rotation, a force-transmitting element pivotally connected at its opposite ends to said braking devices, and means for effecting transverse movement of said element, the points of connection between said element and said devices being such that transverse movement of said element serves to pivot both devices into engagement with the respective drums.

3. A reel-braking mechanism for a magnetic recorder and player comprising a supporting member, two spindles rotatably carried by said member in spaced apart relation, two brake drums rotatably carried by said spindles, two braking devices pivotally mounted on said member for frictional engagement with said drums respectively, one device being self-energizing for one direction of rotation of its drum and non-self-energizing for the opposite direction of rotation, the other device being self-energizing for said opposite direction of rotation of its drum and non-self-energizing for said one direction of rotation, a force-transmitting element pivotally connected at its opposite ends to said braking devices, the points of connection between said element and said devices being such that transverse movement of said element serves to pivot both devices into engagement with the respective drums, and an actuating link pivotally connected to said element intermediate the said points of connection for moving said element transversely to apply said braking devices.

References Cited in the file of this patent

UNITED STATES PATENTS

| | | |
|---|---|---|
| 544,936 | Shoemaker | Aug. 20, 1895 |
| 1,789,607 | Steurer | Jan. 20, 1931 |
| 2,626,760 | Chick | Jan. 27, 1953 |
| 2,652,910 | Godeck | Sept. 22, 1953 |
| 2,741,439 | Dale et al. | Apr. 10, 1956 |
| 2,782,263 | Hoehn | Feb. 19, 1957 |

FOREIGN PATENTS

| | | |
|---|---|---|
| 23,660 | Great Britain | Oct. 16, 1912 |